(12) United States Patent
Patton

(10) Patent No.: US 12,291,954 B2
(45) Date of Patent: *May 6, 2025

(54) SYSTEM FOR FRICTION REDUCTION USING NANO-BUBBLES

(71) Applicant: HYDROZONIX, LLC, Conroe, TX (US)

(72) Inventor: Mark Patton, Conroe, TX (US)

(73) Assignee: HYDROZONIX, LLC, Conroe, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,645

(22) Filed: Nov. 9, 2021

(65) Prior Publication Data

US 2022/0065076 A1   Mar. 3, 2022

Related U.S. Application Data

(63) Continuation of application No. 16/661,899, filed on Oct. 23, 2019, now Pat. No. 11,168,544.

(Continued)

(51) Int. Cl.
*E21B 43/40* (2006.01)
*C02F 1/72* (2023.01)
(Continued)

(52) U.S. Cl.
CPC ............. *E21B 43/40* (2013.01); *C02F 1/727* (2013.01); *C02F 1/78* (2013.01); *C02F 2103/10* (2013.01);
(Continued)

(58) Field of Classification Search
CPC ........ E21B 41/00; E21B 43/26; E21B 21/062; E21B 41/0057; E21B 43/40; C02F 1/727; C02F 1/78; C02F 2103/10; C02F 2201/008; C02F 2303/04; C02F 2209/008; C02F 2303/26
See application file for complete search history.

(56) References Cited

U.S. PATENT DOCUMENTS 5,527,465 A * 6/1996 Dickerson ................. C02F 1/78
                                                                210/764
11,168,544 B2 * 11/2021 Patton ..................... E21B 43/40
(Continued)

*Primary Examiner* — James G Sayre
(74) *Attorney, Agent, or Firm* — Wayne Edward Ramage; Baker Donelson

(57) ABSTRACT

An automated produced water treatment system that injects ozone or an ozone-oxygen mixture upstream of produced water separators, with the dose rate changing dynamically as the produced water quality changes, as determined by continuous monitoring of the produced water quality by a plurality of sensors that detect water quality parameters in real time. The system may operate as a "slipstream" injection system, that draws a portion of produced water from the produced water pipeline and injects ozone or an ozone-oxygen mixture back into the pipeline with disrupting or slowing normal operations. Disinfectants or other additives may also be injected. The treatment system may be wholly or partially contained in mobile containers or trailers, for on-the-fly use in existing produced water treatment facilities. Ozone and/or nitrogen micro-bubbles and/or nano-bubbles may be introduced for friction reduction in oil and gas operations.

14 Claims, 3 Drawing Sheets

Related U.S. Application Data

(60) Provisional application No. 62/749,148, filed on Oct. 23, 2018.

(51) Int. Cl.
    *C02F 1/78*         (2023.01)
    *C02F 103/10*     (2006.01)
    *E21B 43/26*      (2006.01)

(52) U.S. Cl.
    CPC .... *C02F 2201/008* (2013.01); *C02F 2303/04* (2013.01); *E21B 43/2607* (2020.05)

(56) References Cited

U.S. PATENT DOCUMENTS

| | | | | |
|---|---|---|---|---|
| 2001/0042708 | A1* | 11/2001 | Barnes | C02F 1/006 |
| | | | | 210/192 |
| 2008/0237141 | A1* | 10/2008 | Kerfoot | E21B 21/068 |
| | | | | 210/150 |
| 2009/0107917 | A1* | 4/2009 | Capehart | C02F 9/00 |
| | | | | 210/207 |
| 2012/0080374 | A1* | 4/2012 | Komor | C02F 1/78 |
| | | | | 210/603 |

* cited by examiner

SYSTEM FOR FRICTION REDUCTION USING NANO-BUBBLES

This application is a continuation of U.S. patent Ser. No. 16/661,899, filed Oct. 23, 2019, which claims benefit of and priority to U.S. Provisional App. No. 62/749,148, filed. Oct. 23, 2018, both of which are incorporated herein in their entireties by specific reference for all purposes.

FIELD OF INVENTION

This invention relates to an apparatus and system for automatically and dynamically treating injection fluids or fracturing fluids or produced fluids with micro- or nano-bubbles, particularly nitrogen-rich nano-bubbles for oil and gas operations.

BACKGROUND OF THE INVENTION

A variety of oil and gas operations generate large volumes of water mixed with hydrocarbons and various contaminants, generally referred to in the industry as "produced water." Most produced water is contaminated with inorganic salts, metals, organic compounds, and other materials, such as emulsifiers or other agents that may be injected for various types of enhanced recovery operations. Typical hydrocarbons in produced water include semivolatile organic compounds ("SVOCs") and volatile organic compounds ("VOCs"). In most operations, produced water is treated by a variety of means to separate hydrocarbons from the fluid stream, and and remove or treat contaminants before ultimate disposal. Examples of systems and methods for treating produced water are described in Sullivan, et al., US 2009/0101572, Ikebe, et al., US 2010/0264068, Folkvang, US 2014/0346118, and Patton, U.S. patent application Ser. No. 16/246,646, filed Mar. 22, 2019, all of which are incorporated herein in their entireties by specific reference for all purposes.

SUMMARY OF THE INVENTION

In various exemplary embodiments, the present invention comprises an automated treatment system that injects an apparatus and system for dynamically treating injection fluids or fracturing fluids or produced fluids with micro-bubbles and/or nano-bubbles for various oil and gas operations, including, but not limited to, produced water or salt water disposal/injection wells, waterflooding or other forms of enhanced oil recovery (EOR) operations, and hydraulic fracturing operations. In several embodiments, the micro-bubbles and/or nano-bubbles are primarily or wholly nitrogen, or have nitrogen added.

The introduction of the nitrogen micro-bubbles and/or nano-bubbles to the fluid being injected results in substantial friction reduction during the treatment and injection process, and thus also reduces the injection/disposal well pump pressured. In several additional embodiments, the micro-bubbles and/or nano-bubbles with added ozone also disinfect the fluid prior to use (e.g., disinfecting the water used for hydraulic fracturing right before use, as the water is pumped to the frac site). An advantage of using nitrogen is that, as an inert gas, nitrogen will not increase corrosion in the treatment system, injection well, production wells, or other components of the system. Nitrogen also will not degrade (unlike oxygen), and thus will remain in the fluids, and can reduce friction not only in injection systems and wells, but also in production wells and systems. As such, the use of nitrogen micro-bubbles and/or nano-bubbles can replace the use of chemical-based friction reducers that are added to the fluids being injected, particularly in hydraulic fracturing applications. The present invention thus provides a system for achieving a chemical-additive-free or close to chemical-additive-free fracturing operation.

In one exemplary embodiment, the micro-bubbles and/or nano-bubbles are introduced into the fluid flow via a nano-bubble diffuser or manifold. The nano-bubble diffuser introduces the nitrogen-based inert gas into the produced water or fracturing or injection fluid in the form of micro- or nano-bubbles, which provide friction reduction and reduces the injection/disposal well pump pressure, as described above. A manifold system may be used to introduce ozone/oxygen (which may be in the form of micro- and/or nano-bubbles) just prior to injection for "on-the-fly" disinfection and treatment, while also providing friction reduction benefits. A secondary system introduces nitrogen or nitrogen-rich gas in the form of micro- and/or nano-bubbles (through nano-bubble diffusers) to increase or optimize friction reduction. The nitrogen nano-bubble delivery system also may be used independently as an "on-the-fly" stand-alone friction reduction system. A nitrogen concentrator also may be used to add nitrogen or increase the nitrogen concentration in a gas prior to forming the bubbles.

While the system may be a permanently installed component of a produced water treatment facility, EOR/waterflood facility, or hydraulic fracturing facility, in various exemplary embodiments, the system may be contained in one or more portable, movable containers or trailers with ventilation, such as a modified shipping container or trailer. One or more doors allow user access to the interior, which contains the components of the system. The container/trailer is moved to a desired location next to a section of the produced water pipeline, and fluid connection is made. The present system can thus be easily retro-fitted to existing facilities, removed when operations are terminated, or moved from location to location as needed.

DETAILED DESCRIPTION OF EXEMPLARY EMBODIMENTS

Figure 1:
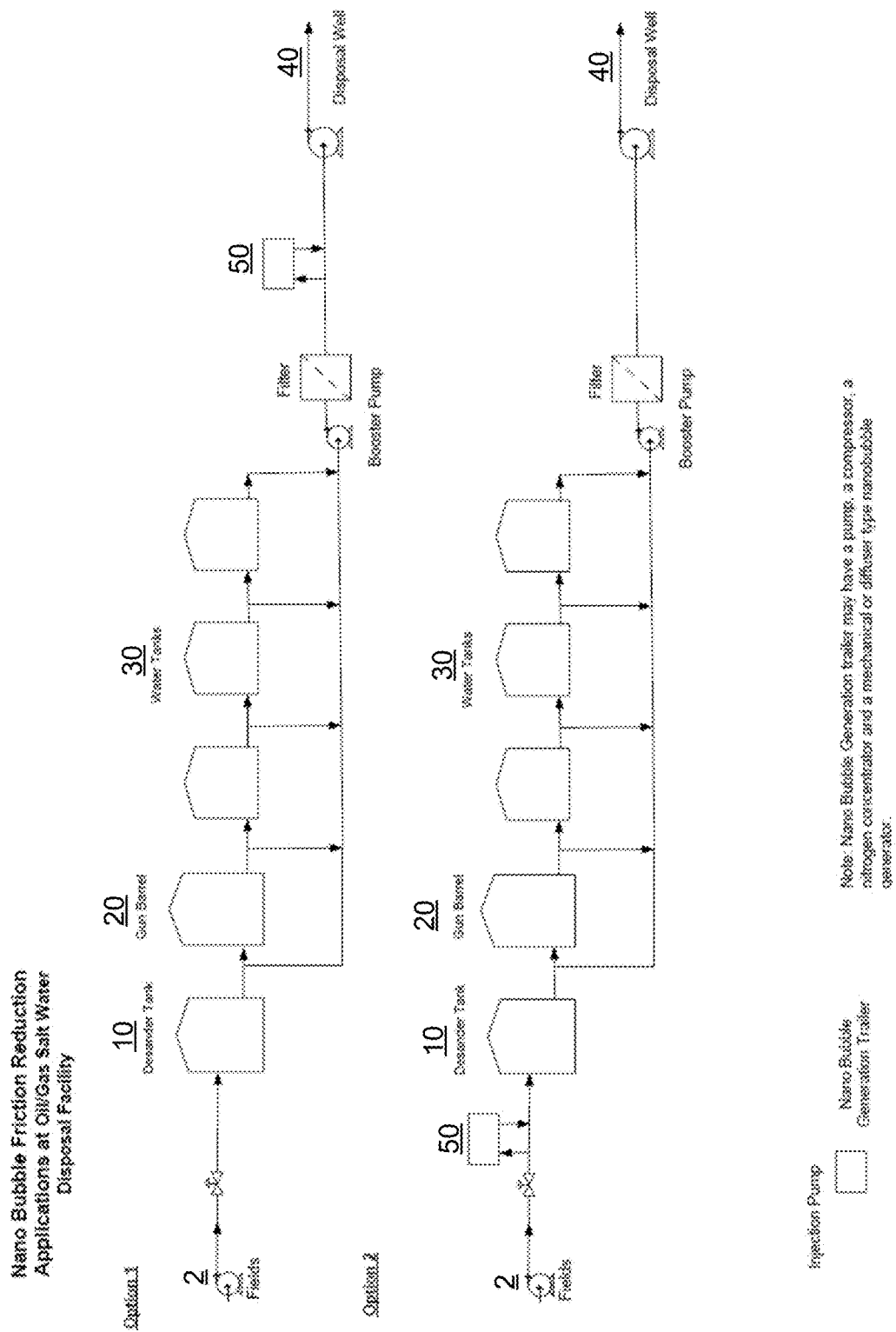
FIG. 1 shows a diagram of an exemplary embodiment of the present invention for produced water treatment.

Produced water originates at the wellhead or other source 2, and then typically travels via pipeline to tank batteries 30, where held for a gathering system for processing and treatment. In general, oil or other hydrocarbons are separated and collected, and the remaining wastewater is directed to an injection or disposal well 40, and may sometimes be used as fracturing fluid. One of the most common oil/water separation systems use one or more "desander" tanks 10 and/or "gun barrel" separation tanks 20.

As the produced water travels from the wellhead/source and through the gathering system, it is subjected to various treatments or processes. For example, the produced water receives injections of chemicals at or near the well head, either in batch or continuous treatments. As the produced water slows down in the gun barrel separators, bacteria can accumulate and hydrogen sulfide can form. To counter this, biocidal agents typically are added upstream of the gun barrel separators. Chemical biocides generally are added at a predetermined, constant dose rate, but as produced water quality changes, this constant dose rate becomes ineffective.

Figure 2:
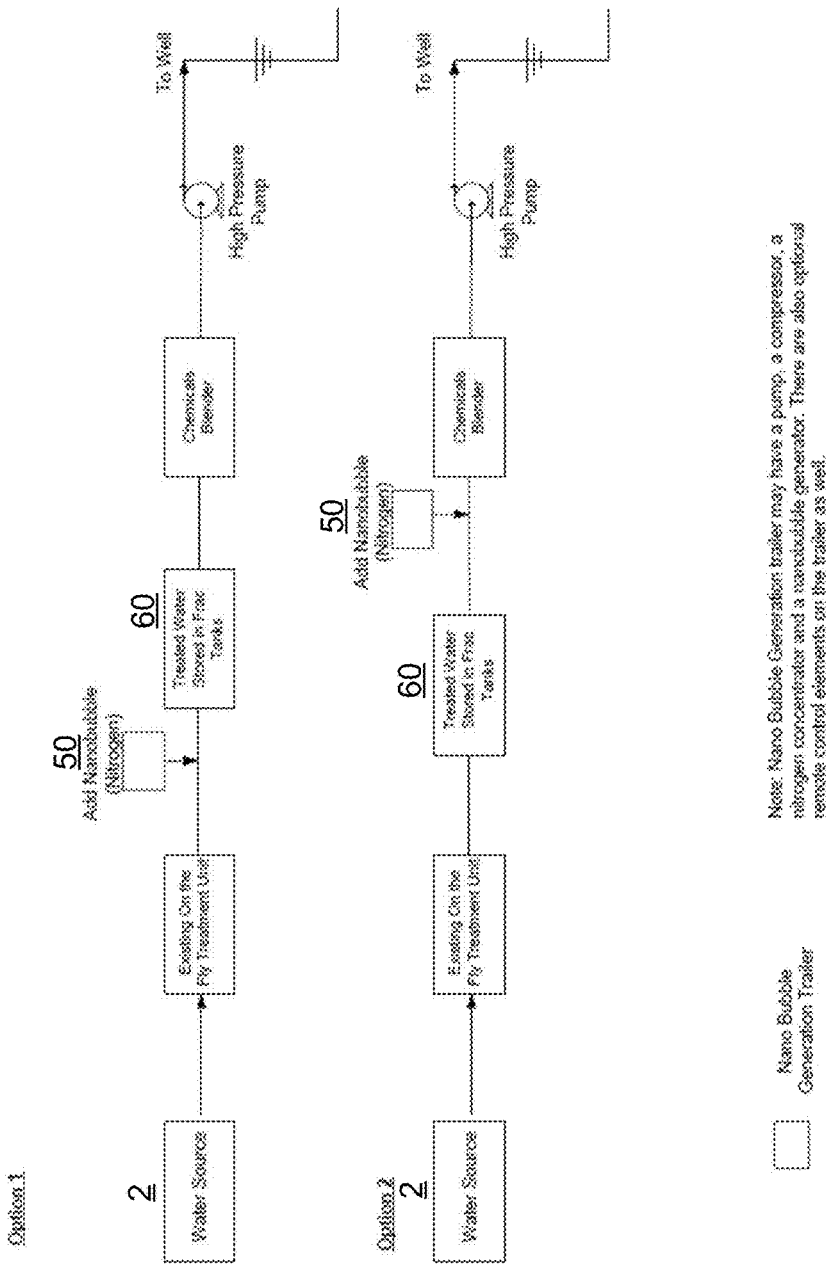
FIG. 2 shows a diagram of an exemplary embodiment of the present invention for hydraulic fracturing fluid or enhanced oil recovery/waterflood fluid injection.
Figure 3:
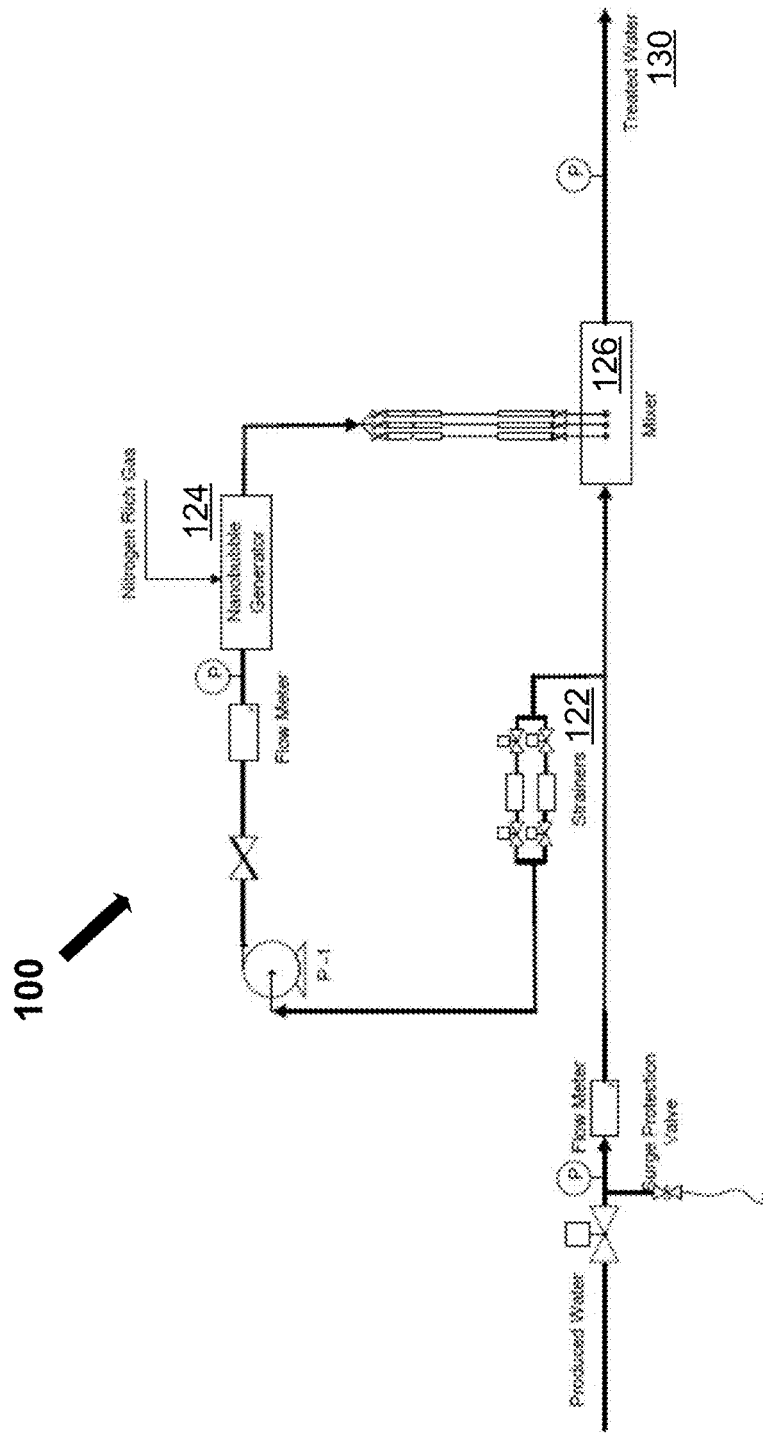
FIG. 3 shows a diagram of a manifold system in accordance with another exemplary embodiment of the present invention.

In various exemplary embodiments, as seen in FIGS. 1-3, the present invention comprises an apparatus and system for dynamically treating injection fluids or fracturing fluids or produced fluids with micro-bubbles and/or nano-bubbles for various oil and gas operations, including, but not limited to, produced water or salt water disposal/injection wells, water-flooding or other forms of enhanced oil recovery (EOR) operations, and hydraulic fracturing operations. In several embodiments, the micro-bubbles and/or nano-bubbles are primarily or wholly nitrogen, or have nitrogen added.

The introduction of the nitrogen micro-bubbles and/or nano-bubbles to the fluid being injected results in substantial friction reduction during the treatment and injection process, and thus also reduces the injection/disposal well pump pressured. In several additional embodiments, the micro-bubbles and/or nano-bubbles with added ozone also disinfect the fluid prior to use (e.g., disinfecting the water used for hydraulic fracturing right before use, as the water is pumped to the frac site). An advantage of using nitrogen is that, as an inert gas, nitrogen will not increase corrosion in the treatment system, injection well, production wells, or other components of the system. Nitrogen also will not degrade (unlike oxygen), and thus will remain in the fluids, and can reduce friction not only in injection systems and wells, but also in production wells and systems. As such, the use of nitrogen micro-bubbles and/or nano-bubbles can replace the use of chemical-based friction reducers that are added to the fluids being injected, particularly in hydraulic fracturing applications. The present invention thus provides a system for achieving a chemical-additive-free or close to chemical-additive-free fracturing operation.

In one exemplary embodiment, the micro-bubbles and/or nano-bubbles are introduced into the fluid flow via a nano-bubble diffuser or manifold 100, as seen in FIG. 3. The nano-bubble diffuser introduces the nitrogen-based inert gas into the produced water or fracturing or injection fluid in the form of micro- or nano-bubbles, which provide friction reduction and reduces the injection/disposal well pump pressure, as described above.

The manifold system in FIG. 3 also may be used to introduce ozone/oxygen (which may be in the form of micro- and/or nano-bubbles) just prior to injection for "on-the-fly" disinfection and treatment, while also providing friction reduction benefits. A secondary system introduces nitrogen or nitrogen-rich gas in the form of micro- and/or nano-bubbles (through nano-bubble diffusers) to increase or optimize friction reduction. The nitrogen nano-bubble delivery system also may be used independently as an "on-the-fly" stand-alone friction reduction system. A nitrogen concentrator also may be used to add nitrogen or increase the nitrogen concentration in a gas prior to forming the bubbles.

In several embodiments, the present invention comprises an automated treatment system that injects ozone or an ozone-oxygen mixture upstream of the separators, with the dose rate changing dynamically as the produced water quality changes (as determined by continuous monitoring of the produced water quality). While ozone-oxygen may be added directly, the system may operate as a "slipstream" injection system, that draws a portion of produced water from the produced water pipeline and injects ozone or an ozone-oxygen mixture into this drawn-off portion, which is then introduced back into the main produced water pipeline without disrupting or slowing normal operations. Disinfectants or other additives may also be injected into the drawn-off portion (or directly into the main produced water pipeline). The ozone is consumed rapidly by bacteria, iron, sulfides and other reducers in the produced water stream, while the oxygen bubbles in the produced water provides an Induced Gas Flotation (IGF) effect in the downstream separators. The IGF effect clarifies the water by removing suspended matter in the produced water, such as oil or solids. The oxygen bubbles adhere to suspended matter, provide lift, floats lighter solids to the surface of the water, and improves the oil/water separation process.

In the ozone generation process, oxygen is separated from ambient air, with the remaining "reject gas" (i.e., the oxygen-depleted ambient air left after separation) typically vented to the atmosphere in prior art operations. Some or all of the reject gas may also be injected into the produced water or fluid stream using a nano-bubble diffuser prior to disposal in the injection well. The nano-bubble diffuser introduces the inert gas (mostly nitrogen) into the produced water in the form of micro- or nano-bubbles, which provide friction reduction in the fluid being injected into the injection/disposal well, and reduces the injection/disposal well pump pressure, as described above.

While the system may be a permanently installed component of a produced water treatment facility, EOR/waterflood facility, or hydraulic fracturing facility, in various exemplary embodiments, the system may be contained in one or more portable, movable containers or trailers with ventilation, such as a modified shipping container or trailer 50. One or more doors allow user access to the interior, which contains the components of the system. The container/trailer is moved to a desired location next to a section of the produced water pipeline, and fluid connection is made. The present system can thus be easily retro-fitted to existing facilities, removed when operations are terminated, or moved from location to location as needed. The system is fully automatic once installed, monitoring water/fluid quality and adjusting nitrogen injection rates automatically, and can be monitored and operated remotely, using a remote computer or mobile computing device (e.g., cell phone, tablet, laptop computer).

FIG. 1 shows two examples of optional placement for a nitrogen nano-bubble delivery system (e.g., trailer) 50 at an oil/gas produced water (e.g., salt water) disposal facility. As seen, the system may be located just prior to injection in the disposal well, or further upstream, such as prior to treatment in a desander tank and gun barrel tanks (as described above). FIG. 2 shows similar options for fracking water treatment (e.g., typically prior to or after storage in the frac water tanks 60). FIG. 3 shows a schematic of a nitrogen nano-bubble delivery manifold 100. A portion of produced water is drawn off, passed through strainers 122, and injected with nitrogen nano-bubbles 124, then mixed 126 back with the produced water. The treated water 130 then flows downstream for further treatment (if any) and injection. Flow meters are used to monitor fluid flow and control the introduction rates of nitrogen nano-bubbles.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A fluid treatment system configured to treat a fluid stream, comprising:
   one or more fluid treatment tanks;
   one or more pipes in fluid connection with the one or more fluid treatment tanks;
   a nitrogen nano-bubble delivery system, configured to introduce nitrogen or nitrogen-rich gas into the fluid stream, wherein the nitrogen or nitrogen-rich gas is introduced as nano-bubbles; and
   an ozone injection system comprising a source of ozone or ozone-oxygen mixture introduced into drawn-off fluid from the one or more pipes and configured to introduce the ozone gas or ozone-oxygen mixture gas into the fluid stream, wherein the ozone gas or ozone-oxygen mixture gas is introduced as nano-bubbles or micro-bubbles sized so as to reduce friction in the fluid stream in the one or more pipes.

2. The system of claim 1, wherein the ozone injection system introduces the ozone gas or ozone-oxygen mixture gas upstream of the one or more fluid treatment tanks.

3. The system of claim 1, wherein the ozone injection system introduces a dose rate of ozone gas or ozone-oxygen mixture gas that varies over time.

4. The system of claim 3, wherein the dose rate varies dynamically as the quality of the fluid stream changes based upon continuous monitoring of levels of one or more contaminants in the fluid stream.

5. The system of claim 4, wherein the one or more contaminants comprise one or more of the following: inorganic salts, metals, organic compounds, emulsifiers, enhanced recovery operation agents, and petroleum hydrocarbons.

6. The system of claim 1, wherein the ozone injection system produces oxygen-depleted reject gas in the process of producing oxygen and/or ozone.

7. The system of claim 1, wherein the reject gas is directed to a separator as blanket gas.

8. The system of claim 1, wherein the ozone injection system is contained in whole or in part in a moveable container.

9. The system of claim 8, wherein the moveable container is a trailer.

10. The system of claim 1, wherein the ozone injection system is contained in whole or in part in two or more moveable containers or trailers.

11. The system of claim 1, wherein the fluid stream is produced water from oil or gas wells.

12. The system of claim 1, wherein the fluid stream is fracturing fluid for a hydrocarbon fracturing operation.

13. The system of claim 1, wherein the nitrogen or nitrogen-rich gas is injected downstream of the one or more fluid treatment tanks.

14. The system of claim 1, wherein said nitrogen nano-bubble delivery system comprises a manifold with one or more strainers and a mixer.

* * * * *